United States Patent [19]

Desplanches et al.

[11] 4,049,884
[45] Sept. 20, 1977

[54] SODIUM-SULPHUR ELECTRIC CELL

[75] Inventors: Gérard Desplanches, Villejust; Yvon Lazennec, St Michel sur Orge; Alain Wicker, Limours, all of France

[73] Assignee: Compagnie Generale d'Electricite S.A., Paris Cedex, France

[21] Appl. No.: 675,005

[22] Filed: Apr. 8, 1976

[30] Foreign Application Priority Data

Apr. 24, 1975   France ................... 75.12853

[51] Int. Cl.² .................................. H01M 10/39
[52] U.S. Cl. ................... 429/104; 429/126; 429/129
[58] Field of Search ............ 136/6 F, 6 FS, 6 R, 136/20, 83 R, 83 T, 100 R; 429/104, 102, 112, 191, 218, 31, 126, 129

[56] References Cited

U.S. PATENT DOCUMENTS 3,811,943   5/1974   Minck et al. ................. 136/6 FS
3,946,751   3/1976   Breiter et al. ................ 136/6 FS
3,960,596   6/1976   Mitoff et al. ................. 136/6 FS Primary Examiner—Anthony Skapars
Attorney, Agent, or Firm—Sughrue, Rothwell, Mion, Zinn and Macpeak

[57] ABSTRACT

The invention relates to a new structure for a sodium-sulphur cell. Such a cell comprises a cathode tank containing sulphur, an electrolyte tube closed, at its lower end, containing sodium and immersed in sulphur, a sodium anode tank, a ceramic support holding the said tank and the tube, the cathode tank being fitted with graphite felt washers ensuring cathode collection of the current, the outside face of the electrolyte tube being, except for the lower end, lined with a porous insulating coating, a graphite felt part being, moreover, inserted between the said lower end of the electrolyte tube and the bottom of the cathode tank. The invention is implemented in sodium sulphur cell batteries for electric vehicles.

12 Claims, 1 Drawing Figure

U.S. Patent  Sept. 20, 1977  4,049,884
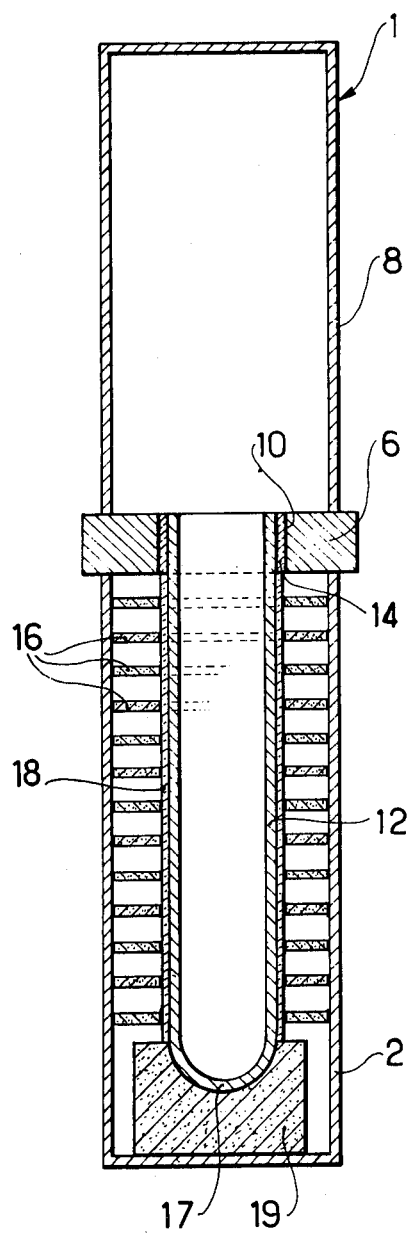

SODIUM-SULPHUR ELECTRIC CELL

The present invention relates to electric cells of the sodium-sulphur type.

It is known that in these cells, the anode reagent is constituted by an alkaline metal, generally sodium, which must be liquid at operating temperature. The cathode reagent is constituted generally by sulphur and the sodium salts of that element, but can be constituted also by phosphorus, selenium and the alkaline salts of those elements. In the case where the reagent materials are sulphur and sodium, the electrochemical reaction leads to a reversible forming of sodium polysulphides whose sodium content increases during the discharge. As for the electrolyte, which separates the cathode and anode reagent, it must be solid at operating temperature, that is, about 300° C, permeable to the alkaline ions which form in the anode compartment and impermeable to the electrons. It is generally constituted by beta sodium alumina, that is, by a compound comprising about five to nine molecules of alumina for one molecule of sodium oxide. It has, generally, the shape of a tube closed at its lower part, containing the anode reagent and immersed in the cathode reagent, the latter reagent being contained in a metallic cathode tank and impregnating a graphite felt. The electrolyte tube is maintained by a support connected in a fluid-tight manner to that cathode tank and also to an anode reagent tank.

Generally, the said support is in the form of a plate or disk made of alpha-alumina. That disk comprises a central bore in which the beta sodium alumina tube is fitted.

Moreover, in his U.S. Pat. No. 3,748,178 of July 24, 1973, for "Improvements to electric cells of the sodium-sulphur type and more particularly to the cathode compartments of those cells", the Applicant mentioned certain hazards in operation of such cells.

More particularly, the Applicant has observed that often, such cells could bear only a limited number of charge-discharge cycles, for example in the order of 60, because of the appearance of an electronic conduction within the electrolyte.

That conduction seems due to the presence of microscopic fissures which become filled up with the metallic sodium.

There ensues, more particularly during the charge, the creating of shunts which prevent the sodium from passing back into the anode compartment.

It seems that these microscopic fissures result from an electrolysis of the beta sodium alumina, during the charge, due to the lack of sodium supply, extracted from the polysulphides formed during the discharge, at the level of the contacts between the graphite felt and the beta sodium alumina.

Moreover, during the charge, a deposit of sulphur is observed on the said beta sodium alumina, resulting from the decomposition of the polysulphides.

To obviate such disadvantages, the Applicant had proposed to arrange electrically insulating means between the electrolyte and the graphite filter, those means practically not disturbing the ionic exchanges taking place within the generator.

According to one embodiment, those means can comprise a thin porous layer deposited on the electrolyte, having a thickness of a few tens of microns, constituted by alpha-alumina, the dimensions of the pores of that layer being less than 10 microns. Alpha alumina has, more particularly, the advantage of being very adhesive on beta sodium alumina.

According to another embodiment, those means can comprise a glass or ceramic felt fabric and, more particularly, a zirconium or alumina fabric.

The graphite felt being electrically insulated from the electrolyte, an electrolysis of the said electrolyte during the charge is thus avoided, for the current cannot pass.

It follows that microscopic fissures are not formed within the electrolyte and that, due to this, the cell can bear numerous charge-discharge cycles.

It is necessary for the separation means arranged between the electrolyte and the graphite felt to be porous, so that they can be impregnated with the polysulphides formed during the discharge, these ensuring ionic conductivity.

Nevertheless, in the case where a glass fabric or a ceramic felt are used, for instance zirconium, alumina or glass fabric or others, a certain damage caused by the polysulphides during the discharge is, however, observed.

Moreover, on the starting up of such an electric cell, it is necessary for the cathode reagent to have a certain electronic conductivity for the ionic exchanges to be able to take place. Now, sulphur has very poor conductivity, even at 300° C. It has therefore been proposed to add, to the said sulphur, precisely, polysulphides, with a view to improving the conductivity and to promoting, thus, the starting up of the cell.

Nevertheless, the polysulphides thus used are generally obtained by dehydrating sodium sulphide $Na_2S$, that dehydrating being, moreover, incomplete, in the majority of cases. The result of this is that the residual water forms, in the cathode compartment, soda with the sodium, such a base being corrosive with respect to the felts and glass parts used. Moreover, such substances are relatively expensive.

To overcome such disadvantages, resulting from the adding of polysulphides, the Applicant conceived the idea of promoting, on the starting up of the cell, a forming "in situ" of polysulphides which, of course, do not have the above-mentioned disadvantages.

Moreover, in such a cell, the recharge process can be effected in a very complete way, as will be explained elsewhere.

The present invention therefore has as its object an electric cell of the sodium-sulphur type comprising:

A cathode tank containing a cathode reagent which is liquid at operating temperature and is chosen from the group formed by sulphur, phosphorus, selenium and the alkaline salts of those elements;

At least one tube of solid electrolyte closed at its lower end, containing an anode reagent which is liauid at operating temperature, constituted by an alkaline metal and arranged in the said cathode tank in order to be immersed in the said cathode reagent, the walls of that tube being made of beta alkaline alumina;

A support made of a ceramic insulating material, for holding the said electrolyte tube in the said cathode tank, the connection between that support and that tube being provided by means of a glass part;

An anode tank containing a supply of the said anode reagent and arranged above the said cathode tank, so that the said electrolyte tube opens at its upper part into that anode tank, the said plate separating the open ends of the said anode tank and of the said cathode tank, the said cathode tank being fitted with washers made of graphite felt ensuring the cathode collection of the current generated, that cell being characterized in that on the one hand, the outside face of the said electrolyte tube, with the exception of its lower end comprises a porous coating which is electronically insulating and is intended to insulate the said washers from the said electrolyte tube and that on the other hand, a part made of graphite felt is arranged between the said lower end of the electrolyte tube and the bottom of the said cathode tank.

Other characteristics and advantages of the invention will become apparent from the following description, given by way of an example and only by way of illustration and having no limiting character, with reference to the accompanying drawing, which shows an electric cell according to the invention.

The present cell has the shape of a cylinder of revolution and the figure is a cross-section view thereof in an axial plane.

The cell shown comprises a cylindrical cathode tank 2, fitted with graphite felt washers 16 impregnated with sulphur and fulfilling the function of a current collector. The wall of the tank 2 is sealed at its upper part to the lower face of an alpha alumina plate 6 which is horizontal and circular.

A cylindrical anode tank 8, having substantially the same diameter as the cathode tank 2, is sealed in the same way by its lower part to the upper face of the plate 6.

It contains a supply of anode reagent constituted by liquid sodium.

The plate 6 is drilled at its centre with a cylindrical bore 10 having a vertical axis. The open upper end of an electrolyte tube 12, which is closed at its lower end, made of beta sodium alumina and containing the anode reagent is engaged in that bore 10.

The upper edge of the tube 12 is in the plane of the upper face of the plate 6.

A glass connecting part 14 is inserted between the outside wall of the top of the tube 12 and the wall of the bore 10 drilled in the plate 6 so as to make the connection fluid-tight.

According to the invention, the outside face of the electrolyte tube 12, except for the lower part 17, is covered with a glass fabric or with a ceramic filter 18 made of either alumina or zirconium or another substance which is electrically insulating and porous, the dimension of the pores being less than 10 microns, such a coating having a thickness of about 1 mm being intended (as previously mentioned) for insulating the electrolyte tube 12 from the graphite felt washers 16.

Previous to its being used, such a felt is heat treated in air at a temperature comprised between 900° and 1100° C, preferably 1000° C, maintained for about 1 hour, with a view to imparting thereto an almost absolute resistance to the aggressiveness of sulphides.

In the case where a glass fabric is used, the said temperature is, to great advantage, comprised between 500° and 700° C, preferably 600° C.

Moreover, a part 19 made of graphic felt, of the same type as the washers 16 is arranged between the lower part 17 of the tube 12, which is not coated with the layer 18, and the bottom of the cathode tank 2.

Consequently, as soon as the cell is brought to its operating temperature, the following reaction takes place on contact between the lower part 17 of the electrolyte tube 12 and the part 19:

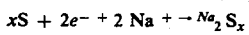

It will therefore be seen that there occurs a forming "in situ" of a small quantity of polysulphides which thus ensure the starting up of the cell subsequent to the increase in the electronic conductivity of the cathode reagent, in this case, sulphur.

It will therefore be seen that the cell according to the invention has an excellent resistance to the aggressiveness of the various reagents implemented and, consequently, a longer service life.

Moreover, one remarkable advantage of such a cell structure results from the fact that it is possible to effect a very thorough recharge. Indeed, it is known that at the time of the discharge, the sulphur is transformed into polysulphides of sodium according to the sequence herebelow:

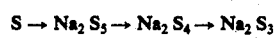

At the time of the recharge, the reverse process is carried out.

Nevertheless, at the time of the recharge, it was observed that it was practically impossible to effect the transformation:

The cell according to the invention makes it possible, precisely, to effect that transformation and to effect, consequently, a very thorough recharge. That particularly, which constitutes an advantage, established experimentally by the Applicant, results from the ionic conductivity of the coating 18, more particularly cooperating with the implementing of the part 19 ensuring the production "in situ" of polysulphides.

It must be understood that the invention is in no way limited to the embodiment described and aillustrated, which has been given only by way of an example. More particularly, without going beyond the scope of the invention, it is possible to introduce modifications in details, to change certain arrangements or to replace certain means by equivalent means.

We claim:
1. Electric cell of the sodium-sulphur type comprising:
 a cathode tank containing a cathode reagent which is liquid at operating temperature and is chosen from the group formed by sulphur, phosphorus, selenium and the alkaline salts of those elements;
 at least one tube of solid electrolyte closed at its lower end, containing an anode reagent which is liquid at operating temperature, constituted by an alkaline metal and arranged in said cathode tank in order to be immersed in said cathode reagent, the walls of that tube being made of beta alkaline alumina;
 a support made of a ceramic insulating material, for holding said electrolyte tube in said cathode tank, the connection between that support and that tube being provided by means of a glass part;
 an anode tank containing a supply of said anode reagent and arranged above said cathode tank, so that said electrolyte tube opens at its upper part into that anode tank, said support separating the open ends of said anode tank and of said cathode tank, the said cathode tank being fitted with washers made of graphite felt ensuring the cathode collection of the current generated, that cell being characterized in that on the one hand, the outside face of said elec- trolyte tube, with the exception of its lower end comprises a porous coating which is electronically insulating and is intended to insulate said washers from said electrolyte tube and that on the other hand, a part made of graphite felt is arranged between said lower end of the electrolyte tube and the bottom of said cathode tank.

2. Cell according to claim 1, characterized in that said coating is a glass fabric.

3. Cell according to claim 1, characterized in that said coating is a ceramic felt.

4. Cell according to claim 3, characterized in that said ceramic felt is an alumina felt.

5. Cell according to claim 3, characterized in that said ceramic felt is a zirconium felt.

6. Cell according to claim 1, characterized in that the dimension of the pores of said coating is at the most equal to 10 microns.

7. Cell according to claim 2, characterized in that said coating is previously heat treated at a temperature, comprised between 500° and 700° C, maintained for about 1 hour.

8. Cell according to claim 3, characterized in that said coating is previously heat treated at a temperature comprised between 900° and 1100° C, maintained for about 1 hour, with a view to imparting thereto an almost absolute resistance to the aggressiveness of sulphides.

9. Cell according to claim 7, characterized in that the heat treatment is effected in air.

10. Battery comprising at least one said electric cell according to claim 1.

11. Cell according to claim 7 wherein the temperature is 600° C.

12. Cell according to claim 8 wherein the temperature is 1000° C.

* * * * *